United States Patent [19]

Collins et al.

[11] 4,040,777
[45] Aug. 9, 1977

[54] FLASH LAMP ARRAY HAVING SHORTING LAMPS

[75] Inventors: Edward J. Collins, Euclid; Donald C. Medved, Bellevue, both of Ohio

[73] Assignee: General Electric Company, Schenectady, N.Y.

[21] Appl. No.: 572,196

[22] Filed: Apr. 28, 1975

[51] Int. Cl.$^2$ .............................................. F21K 5/02
[52] U.S. Cl. ............................... 431/95 A; 431/95 R
[58] Field of Search ................... 431/95 A, 95 R, 94; 95/11.5; 67/31; 315/240; 240/1.3

[56] References Cited

U.S. PATENT DOCUMENTS

| | | | |
|---|---|---|---|
| 2,781,654 | 2/1957 | Pipkin | 431/94 |
| 2,858,686 | 11/1958 | Roth | 431/94 |
| 2,972,937 | 2/1961 | Suits | 95/11.5 |
| 3,046,769 | 7/1962 | Anderson et al. | 431/94 X |
| 3,106,080 | 10/1963 | Suits | 67/31 |
| 3,443,875 | 5/1969 | Herrmann | 431/95 |
| 3,458,756 | 7/1969 | Kotsch | 315/65 |
| 3,459,488 | 8/1969 | Schroder et al. | 431/95 |
| 3,473,880 | 10/1969 | Wick | 431/95 |
| 3,532,931 | 10/1970 | Cote et al. | 315/240 |
| 3,552,896 | 1/1971 | Kuhlmann | 431/95 |
| 3,692,995 | 9/1972 | Wagner | 431/95 X |
| 3,816,054 | 6/1974 | Baldridge, Jr. | 431/95 |
| 3,817,683 | 6/1974 | Weber | 431/95 |
| 3,884,615 | 5/1975 | Sobieski | 431/95 |

FOREIGN PATENT DOCUMENTS

| | | | |
|---|---|---|---|
| 1,143,708 | 7/1959 | Germany | 431/94 |

*Primary Examiner*—Edgar W. Geoghegan
*Attorney, Agent, or Firm*—Norman C. Fulmer; Lawrence R. Kempton; Frank L. Neuhauser

[57] ABSTRACT

Flash lamp array sequencing circuits in which the lamps are provided with heat-sensitive switch material on the outside surface of the bulbs and extending between lead-in wires. The switch material initially has a relatively high impedance, and changes to a relatively low impedance between the lead-in wires when heated by the lamp when it is flashed. A coating of lacquer or plastic is provided over the bulb and switch material.

15 Claims, 4 Drawing Figures

U.S. Patent     Aug. 9, 1977     4,040,777
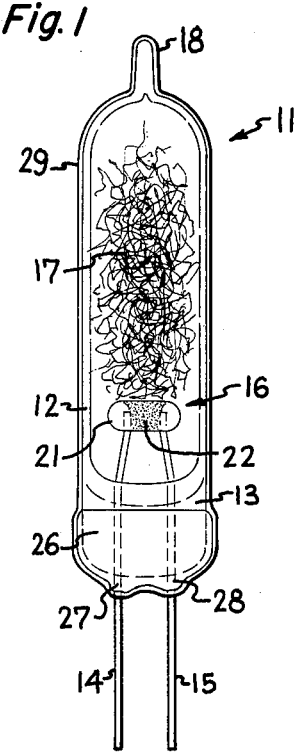
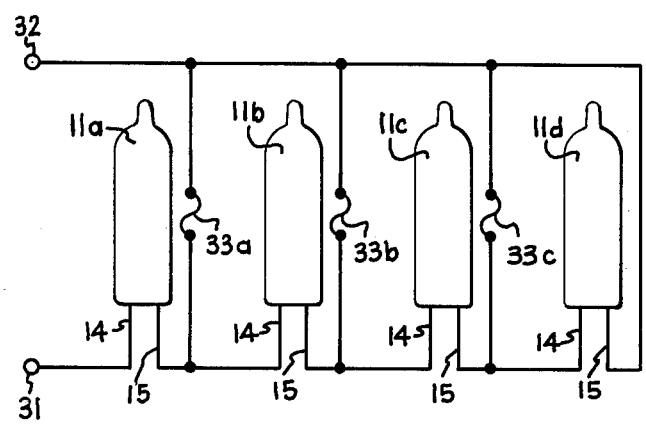
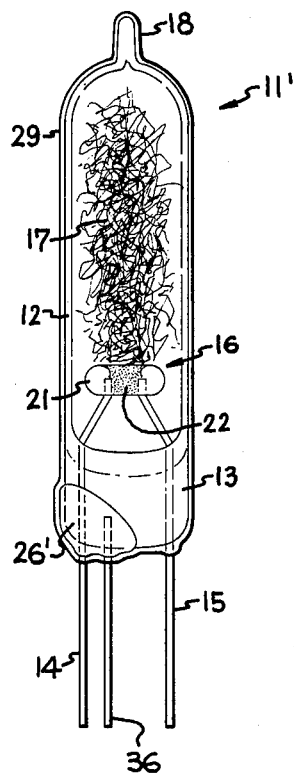
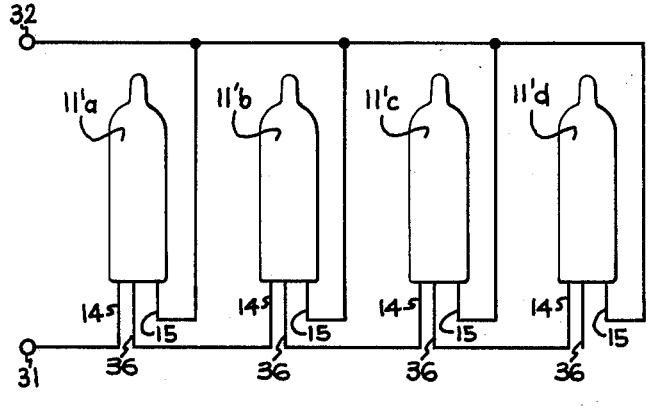

FLASH LAMP ARRAY HAVING SHORTING LAMPS

CROSS-REFERENCES TO RELATED APPLICATIONS

Ser. No. 571,264, filed Apr. 24, 1975, Paul T. Cote, "Photoflash Lamp Providing After-Flash Shorting," assigned the same as the present invention.

Ser. No. 567,576, filed Apr. 14, 1975, Vaughn C. Sterling and Lewis J. Schupp, "Multiple Flash Lamp System," assigned the same as the present invention.

Ser. No. 453,487, filed Mar. 21, 1974, John C. Sobieski, "Flash Lamp Mount Construction," now U.S. Pat. No 3,844,615 and assigned the same as the present invention.

Ser. No. 508,105, filed Sept. 23, 1974, Robert L. Smialek and Mary S. Jaffe, "Switching Devices for Photoflash Unit," abandoned in favor of continuation-in-part Ser. No. 617,668, filed Sept. 29, 1975 and issued as U.S. Pat. No. 3,990,832 on Nov. 9, 1976 and assigned the same as the present invention.

BACKGROUND OF THE INVENTION

The invention is in the field of photoflash lamps of the electrically fired type and designed to provide a short circuit, or relatively low impedance, across the lead-in wires after the lamps have been flashed. The invention also is in the field of multiple flash array circuits employing shorting lamps.

U.S. Pat. No. 3,532,931 to Paul Cote and John Harnden shows, in FIGS. 1 and 2, a type of flash lamp sequencing circuit utilizing switches that are normally open (or high impedance) and which close (or change to low impedance) upon flashing of the lamps, and the lamps must have open circuits (or high impedance) across their lead-in wires after flashing. FIG. 3 of the same patent shows a different type of flash lamp sequencing circuit, in which switches (such as fuses) initially have a low impedance and become open-circuited (or high impedance) upon flashing of the lamps, and the lamps must become electrically shorted (or have low impedance) across their lead-in wires upon flashing. The same patent describes the alternatives of employing lamps which reliably short upon flashing, and/or connecting switch devices across the lamps to achieve the same result in the sequencing circuit. U.S. Pat. No. 3,692,995 to Karl Wagner also shows a flash lamp sequencing circuit which employs opening switches and shorting lamps, and describes a type of shorting lamp in which the electrodes melt together. The above-referenced Sterling and Schupp patent application discloses a shorting lamp construction having a primer material, between the lead-in wires in the lamp, which ignites combustible material in the lamp in response to a firing voltage pulse, and the primer material thereupon forms a conductive residue which provides a short circuit, or relatively low impedance, across the lead-in wires.

The above-referenced Cote patent application discloses shorting flash lamps in which an inlead wire is deformed by heat of flashing.

The lamps described above can be the so-called high voltage type of lamp which can be fired by a low energy voltage pulse of about 100 volts or more, and frequently in the range of about 1000 to 3000 volts such as can be produced by impacting a piezoelectric element. U.S. Pat. Nos. 2,972,937 and 3,106,080 to C. G. Suits disclose a high voltage flash lamp and a piezoelectric firing circuit.

SUMMARY OF THE INVENTION

Objects of the invention are to provide new and improved flash lamps of the shorting type and which exhibit low impedance across the lead-in wires after the lamp has flashed, and which can be connected in sequential firing circuits.

The invention comprises, briefly and in a preferred embodiment, a shorting type of flash lamp in which the lamps are provided with heat-sensitive switch material on the outside surface of the bulbs and extending between lead-in wires. The switch material initially has a relatively high impedance, and changes to a relatively low impedance between the lead-in wires when heated by the lamp when it is flashed. A coating of lacquer or plastic is provided over the bulb and switch material. In one embodiment, the switch material is provided between the lead-in wires of a two-wire type of lamp, and these lamps are connected in a circuit along with fuse-switches.

In another embodiment, the switch material is provided between one of the ignition lead-in wires of a lamp and a third wire of the lamp, and these lamps are connected in a circuit which does not require additional switches for causing sequential firing of the lamps.

BRIEF DESCRIPTION OF THE DRAWING

FIG. 1 is a side view of a photoflash lamp in accordance with a preferred embodiment of the invention.

FIG. 2 is a schematic electrical diagram of a sequential firing circuit employing a plurality of the lamps of FIG. 1.

FIG. 3 is a side view of a photoflash lamp in accordance with an alternative preferred embodiment of the invention.

FIG. 4 is an electrical schematic diagram of a sequential firing circuit employing a plurality of the lamps of FIG. 3.

DESCRIPTION OF THE PREFERRED EMBODIMENTS

The lamp 11 of FIG. 1 may be any general type of flash lamp, although it is shown as being a high voltage type of flash lamp as is disclosed in the above-referenced Sobieski patent application. The lamp 11 comprises a tubular envelope 12, preferably made of a borosilicate glass or other suitable vitreous material such as lead glass, and having a stem press seal 13 at one end thereof through which a pair of inlead wires 14, 15 extend from the exterior to the interior of the bulb 12 in a generally mutually parallel spaced-apart manner and form part of a mount 16. The bulb 12 is partially filled, above the mount 16, with a loose mass of filamentary or shredded metal foil or wire 17 of zirconium or hafnium or other suitable combustible metal. Air is exhausted from the bulb 12, and the bulb is filled with oxygen at a pressure of at least several atmospheres, such as about 5 to 10 atmospheres, and the bulb is sealed off at an exhaust tip 18 at the other end thereof from the stem press seal 13.

The mount 16 comprises a glass bead or other vitreous electrically insulative member 21 sealed over and around an end of the pair of inlead wires 14 and 15. An opening is provided through the bead 21 and is between and in communication with both of the inlead wires 14 and 15, within the bulb 12, and this opening is at least partially filled with primer material 22 which bridges across and is in communication with the upper end regions of the inlead wires 14 and 15. Various suitable primer materials are known; for example, a mixture may be prepared of fine particles of zirconium and potassium perchlorate along with a binder such as nitrocellulose and a solvent such as amyl acetate. This mixture, in liquid form, is applied to the opening in the bead with a syringe or by dipping, or other suitable means, and then dried.

In accordance with the invention, at least a portion of the press seal region 13 of the lamp is coated with a switch material 26 which is in contact with and bridges across the lead-in wires 14 and 15. The switch material 26 initially has a relatively high value of impedance before the lamp 11 is flashed, and, in response to heat from the flashing lamp, converts to a relatively low impedance across the lead-in wires 14 and 15. The switch material 26 may comprise a mixture including silver oxide, silver carbonate, and a binder, as is disclosed in the above-referenced Smialek and Jaffe patent application. This mixture is applied to the seal region 13 of the lamp in a paste form, and then dried. Thereafter, preferably, the bulb 12 and switch materials 26 are covered with a conventional protective coating 29 such as lacquer or a plastic material. This coating helps prevent the bulb from shattering when the lamp is flashed, and also protects the switch material 26 against humidity. Preferably, the switch material 26 is coated over substantially the entire seal region 13, as shown, so that it will heat to a higher temperature and more quickly from the heat of the flashing lamp than, for example, would only a small amount of switch material bridging across the lead-in wires 14 and 15 at the underside of the seal region 13. A preferred way of applying the switch material 26 to the lamp 11 is to temporarily bend the lead-in wires 14 and 15 upwardly, then dip the seal region 13 into a solution of the switch material 26, bend the lead-in wires 14 and 15 into the desired configuration for future electrical connection, and then permit the material 26 to dry. In this manner, the switch material will extend slightly along the lead-in wires 14 and 15 at the underside of the seal 13, as indicated by numerals 27 and 28, thus assuring reliable electrical contact of the switch material 26 with the lead-in wires 14 and 15. It has been found that if the switch material 26 is coated over substantially the entire seal region 13, as shown in FIG. 1, when the lamp 11 is flashed, the upper part of the switch material 26 becomes hot, and this heat and the chemical reaction it produces travel rapidly downwardly to the bottom of the seal 13, whereupon the desired effect is achieved of a relatively low impedance between the lead-in wires 14 and 15.

The sequential lamp flashing circuit of FIG. 2 has a pair of input terminals 31, 32 adapted to be connected to a source of electrical firing pulses, for example, firing pulses produced by stressing or impacting a piezoelectric element as described in the above-referenced Suits patents. A plurality of flash lamps 11a, 11b, 11c, and 11d, constructed as shown in FIG. 1, are arranged in desired manner in a housing unit or otherwise, and are connected electrically in series across the terminals 31 and 32, by means of their lead-in wires, as shown in FIG. 2. A plurality of fuses 33a, 33b, and 33c are respectively connected between the junctions of the series-connected flash lamps, and one of the firing pulse terminals 32. Fuse 33a is located sufficiently near the lamp 11a so as to become open-circuited due to heat from the flashing of the lamp; similarly, fuses 33b and 33c are located sufficiently near lamps 11b and 11c so as to become open-circuited by heat radiated from these lamps when they are flashed. No fuse is required adjacent to the last lamp 11a, although there would be no harm in providing such a fuse.

Assuming that none of the lamps in FIG. 2 have yet been flashed, a first firing pulse applied across the terminals 31 and 32 will be applied across the lead-in wires 14 and 15 of lamp 11a, via the fuse 33a, thereby causing the lamp 11a to flash. Upon flashing of lamp 11a, heat radiated therefrom open-circuits the fuse 33a, and also causes short-circuiting, or the formation of a relatively low impedance, between the lead-in wires 14 and 15 of lamp 11a by functioning of the switch material 26 as has been described. Each firing pulse applied to the terminals 31 and 32 has sufficient energy to fire a single lamp; however, if desired, a pulse of greater energy or longer duration can be utilized in order to cause flashing of two or more lamps in quick succession, during the taking of a single picture to obtain a greater amount of illumination. When the next firing pulse is applied across terminals 31 and 32, energy therefrom passes through the shorted switch material 26 of lamp 11a, and through the fuse 33b, to the lead-in wires 14 and 15 of lamp 11b, causing this lamp to flash, whereupon the heat therefrom causes the fuse 33b to become an open circuit and causes short-circuiting or a low impedance between lead wires 14 and 15 of lamp 11b in the manner described above. The foregoing procedure is repeated until all of the lamps of the circuit have become flashed. The purpose of each of the fuses 33a, etc., is to provide an energy path for the firing pulse to be applied to its associated lamp, and thereafter to avoid short-circuiting succeeding firing pulses.

The lamp 11' in FIG. 3 is the same as lamp 11 of FIG. 1, except that a third lead wire 36 is partially embedded in the seal region 13 of the lamp, and the switch material 26' is coated on a portion of the seal region 13 so as to bridge across one of the lead-in wires 14, and the third wire 36. When the lamp 11' is flashed, the heat from its flashing causes the switch material 26' to chemically react, as has been described above, and in this embodiment, the switch material 26', after the lamp 11' has been flashed, produces a short circuit or relatively low impedance across and between the lead-in wire 14 and the third wire 36. It should be noted that in this embodiment the switch material 26' is not connected to a second one of the lead-in wires 15, and has no effect thereon after the lamp has been flashed.

The circuit of FIG. 4 employs a plurality of flash lamps 11'a, 11'b, 11'c, and 11'd, each being constructed in accordance with the lamp 11' shown in FIG. 3. The lead-in wires 15 of each of the lamps 11'a through 11'd are connected electrically to one of the firing pulse terminals 32. The lead-in wire 14 of the first lamp 11'a is connected electrically to the other firing pulse terminal 31, and this lamp's third wire 36 is connected electrically to the lead-in wire 14 of the second lamp 11'b, the third wire 36 of which is connected to the lead-in wire 14 of the next lamp, etc. The third wire 36 of the last lamp 11'd need not be connected. It will be noted that this circuit does not require any fuses as does the circuit of FIG. 2. The circuit of FIG. 4 functions as follows, assuming that each firing pulse applied to the terminals 31 and 32 is of sufficient energy to fire a single lamp. The first firing pulse is applied directly to the lead-in wires 14 and 15 of the first lamp 11'a, thereby causing this lamp to flash, and the heat from flashing causes its switch 26' to provide a short circuit or low impedance between the lead-in wire 14 and the third wire 36. The next firing pulse is applied to the lead-in wires 14 and 15 of the next lamp 11'b, through the aforesaid short circuit or low impedance between the lead-in wire 14 and third wire 36 of the first lamp 11'a, thereby causing the second lamp 11'b to flash. The foregoing procedure is repeated until all of the lamps of the circuit have been flashed. In each of the circuits of FIGS. 2 and 4, the last lamp 11d or 11'd need not be provided with shorting means.

As has been mentioned, the invention can be applied to many different types of flash lamps. For example, the lamp of FIG. 1 and as used in the circuit of FIG. 2, if of the type disclosed in the above-referenced Sobieski patent application, becomes an open circuit or high impedance internally upon flashing, and can therefore be used in the above-described type of sequencing circuit which employs open-circuiting lamps and closing switches. The same lamp can also be adopted for use in the above-described sequencing circuits employing shorting lamps, by applying the switch material 26 thereon as shown in FIG. 1. Thus, a single type of lamp may be manufactured for use in both types of circuits, the lamps being modified as disclosed with reference to FIG. 1 if they are to be used in the shorting lamp type of sequencing circuit. The invention can also be incorporated with flash lamps intended to become internally shorted upon flashing, thus assuring greater reliability of after-flash shorting.

While preferred embodiments and modifications of the invention have been shown and described, various other embodiments and modifications thereof will become apparent to persons skilled in the art and will fall within the scope of the invention as defined in the following claims.

What we claim as new and desire to secure by Letters Patent of the United States is:

1. A photoflash lamp comprising a bulb having a hollow interior containing combustible material adapted to produce light and heat when the lamp is flashed, at least two wires extending outside of said bulb and sealed into said bulb through a seal region extending away from said interior of the bulb, and switch material coated on a portion of the exterior of said bulb and bridging across and in contact with said two wires, said switch material extending toward said bulb interior along one or more sides of said seal region and having a relatively high impedance prior to flashing of said lamp and having the characteristic of reacting to heat produced by said lamp when flashed so as to have a relatively low impedance after the lamp is flashed.

2. A flash lamp as claimed in claim 1, in which said coating of switch material extends a distance along each of said two wires externally of said bulb.

3. A flash lamp as claimed in claim 1, including a coating of protective material over the surface of said bulb and switch material.

4. A flash lamp as claimed in claim 1, including ignition means in said bulb, said two wires constituting lead-in wires connected to said ignition means.

5. A flash lamp as claimed in claim 4, in which said coating of switch material extends a distance along each of said two lead-in wires externally of said bulb.

6. A flash lamp as claimed in claim 4, including a coating of protective material over the surface of said bulb and switch material.

7. A flash lamp as claimed in claim 1, including ignition means in said bulb, and first, second, and third wires extending outside of said bulb, said first and second wires constituting lead-in wires connected to said ignition means, and said first and third wires constituting said two wires bridged by said switch material.

8. A flash lamp as claimed in claim 7, in which said coating of switch material extends a distance along each of said first and third wires.

9. A flash lamp as claimed in claim 7, in which said bulb includes a seal region into which said first, second, and third wires are sealed, said coating of switch material covering a substantially large area of said seal region.

10. A flash lamp as claimed in claim 7, including a coating of protective material over the surface of said bulb and switch material.

11. A photoflash sequential lamp flashing arrangement comprising a plurality of flash lamps each comprising a bulb having a hollow interior containing combustible material adapted to produce light and heat when the lamp is flashed, first and second lead-in wires extending outside of said bulb and sealed into said bulb through a seal region extending away from said interior of the bulb, and circuitry comprising first and second firing pulse input terminals, means connecting said lamps by their lead-in wires in electrical series arranged from a first lamp to a last lamp, means connecting the first lead-in wire of said first lamp to said first input terminal, means connecting the second lead-in wire of said last lamp to said second input terminal, each junction of said lamps constituting a connection of the second lead-in wire of the preceding lamp to the first lead-in wire of the succeeding lamp, and a plurality of fuses connected respectively between said junctions and said second input terminal, each of said fuses being positioned near the lamp to the second lead-in wire of which it is connected so as to become open-circuited by heat of the lamp when flashed, and switch material coated on a portion of the exterior of each of said bulbs except not necessarily that of said last lamp and bridging across and in contact with the first and second lead-in wires thereof, said switch material extending toward said bulb interior along one or more sides of said seal region and having a relatively high impedance prior to flashing of the lamp and having the characteristic of reacting to heat produced by the lamp when flashed so as to have a relatively low impedance after the lamp is flashed.

12. An arrangement as claimed in claim 11, in which each of said flash lamps includes a coating of protective material over the surface of its bulb and switch material.

13. A photoflash sequential lamp flashing arrangement comprising a plurality of flash lamps adapted to produce light and heat when flashed, each of said lamp comprising a bulb from which first, second, and third wires extend externally, said first and second wires constituting lead-in wires for causing the lamp to be flashed by a firing pulse, first and second firing pulse input terminals, means electrically connecting the first lead-in wire of a first of said lamps to said first input terminal, means electrically connecting the third wire of said first lamp to the first lead-in wire of a second one of said lamps, and means electrically connecting the third wire of the next to last of said lamps to the first lead-in wire of the last of said lamps, means electrically connecting the second lead-in wire of each of said lamps to said second input terminal, and switch material coated on a portion of each of said bulbs except not necessarily that of said last lamp and bridging across and in contact with the first and third wires thereof and having a relatively high impedance prior to flashing of the lamp and having the characteristic of reacting to heat produced by the lamp when flashed so as to have a relatively low impedance after the lamp is flashed.

14. An arrangement as claimed in claim 13, in which each of said flash lamps includes a coating of protective material over the surface of its bulb and switch material.

15. A photoflash sequential lamp flashing arrangement comprising a plurality of flash lamps each comprising a bulb having a hollow interior containing combustible material adapted to produce light and heat when the lamp is flashed and having at least two wires extending outside of said bulb and sealed into said bulb through a seal region extending away from said interior of the bulb, and switch material coated on a portion of the exterior of said bulb and bridging across and in contact with said two wires and extending toward said bulb interior along one or more sides of said seal region, said switch material having a relatively high impedance prior to flashing of said lamp and having the characteristic of reacting to heat produced by said lamp when flashed so as to have a relatively low impedance after the lamp is flashed, said arrangement including a pair of input terminals and electrical circuitry connected to cause said lamps to flash in turn in response to firing pulses applied to said input terminals, said electrical circuitry including means electrically connecting said two wires of a first flash lamp between one of said input terminals and one of said two wires of a second flash lamp so that upon flashing of said first lamp said switch material thereon will electrically connect said one input terminal to said one wire of the second lamp.

* * * * *